(12) United States Patent
Prosak et al.

(10) Patent No.: US 10,031,502 B2
(45) Date of Patent: Jul. 24, 2018

(54) I/O EXPANSION FOR SAFETY CONTROLLER

(71) Applicant: Rockwell Automation Germany GMBH & Co. KG, Wuppertal (DE)

(72) Inventors: Bradley Alan Prosak, Shaker Heights, OH (US); Thomas Helpenstein, Grevenbroich (DE); Rudolf Papenbreer, Wuppertal (DE); Mussa Tohidi Khaniki, Wuppertal (DE); Norbert Machuletz, Wetter (DE); Oliver Heckel, Frechen (DE)

(73) Assignee: Rockwell Automation Germany GMBH & Co. KG (DE)

( * ) Notice: Subject to any disclaimer, the term of this patent is extended or adjusted under 35 U.S.C. 154(b) by 384 days.

(21) Appl. No.: 14/671,464

(22) Filed: Mar. 27, 2015

(65) Prior Publication Data

US 2016/0282911 A1 Sep. 29, 2016

(51) Int. Cl.
*G06F 1/18* (2006.01)
*G05B 19/042* (2006.01)

(52) U.S. Cl.
CPC .............. *G05B 19/0428* (2013.01); *G05B 2219/21014* (2013.01); *G05B 2219/21133* (2013.01)

(58) Field of Classification Search
None
See application file for complete search history.

(56) References Cited

U.S. PATENT DOCUMENTS

| | | | |
|---|---|---|---|
| 5,920,715 A | 7/1999 | Heckel et al. | |
| 2003/0208283 A1* | 11/2003 | Vasko | G05B 9/03 700/21 |
| 2004/0010326 A1 | 1/2004 | Schuster | |
| 2004/0210326 A1 | 10/2004 | Muneta et al. | |
| 2005/0010332 A1* | 1/2005 | Abe | G05B 9/03 700/245 |
| 2005/0060605 A1 | 3/2005 | Gibart et al. | |
| 2005/0060606 A1 | 3/2005 | Kalan et al. | |
| 2006/0224811 A1* | 10/2006 | Sichner | G05B 19/0428 710/306 |

(Continued)

FOREIGN PATENT DOCUMENTS

| | | |
|---|---|---|
| EP | 2876510 A1 | 5/2015 |
| WO | 2011/082863 A1 | 7/2011 |

OTHER PUBLICATIONS

SICK AG.; Operating Instructions "Flexi Soft" Modular Safety Controller Hardware—(172) pages.

*Primary Examiner* — Idriss N Alrobaye
*Assistant Examiner* — Dayton Lewis-Taylor
(74) *Attorney, Agent, or Firm* — Boyle Fredrickson, SC (57) ABSTRACT

An industrial safety controller comprises a non-volatile memory configured for storing an industrial control program and at least one processing unit. The industrial safety controller, which may be a safety relay, further comprises connector means configured to communicatively couple the safety controller with an expansion module. The safety controller is configured to receive an input and/or provide an output via an I/O expansion module that is coupled to the safety controller utilizing the connector means. The industrial safety controller may comprise an expansion module bay and the connector means may comprise a bay connector.

19 Claims, 4 Drawing Sheets

(56) References Cited

U.S. PATENT DOCUMENTS

| | | | |
|---|---|---|---|
| 2008/0179504 A1* | 7/2008 | Inoue | F16P 3/144 |
| | | | 250/221 |
| 2008/0209211 A1 | 8/2008 | Grgic et al. | |
| 2010/0082869 A1* | 4/2010 | Lloyd | G06F 13/385 |
| | | | 710/305 |
| 2012/0297101 A1 | 11/2012 | Neupartl et al. | |
| 2014/0075197 A1 | 3/2014 | Alrabady et al. | |
| 2014/0207254 A1 | 7/2014 | Nishiyama et al. | |
| 2014/0215096 A1* | 7/2014 | Pratt | G05B 19/042 |
| | | | 710/8 |

\* cited by examiner

I/O EXPANSION FOR SAFETY CONTROLLER

BACKGROUND

The present disclosure relates generally to industrial automation and control systems, such as those used in industrial and commercial settings. More particularly, the present disclosure relates to high reliability or safety industrial controllers appropriate for use in devices intended to protect human life and health.

Industrial controllers are special purpose computers used in controlling industrial processes. Under the direction of a stored, controlled program, an industrial controller examines a series of inputs reflecting the status of the controlled process and changes a series of outputs controlling the industrial process. The inputs and outputs may be binary, i.e. on or off or analog, providing a value within a substantially continuous range. The inputs may be obtained from sensors attached to the controlled process and the outputs may be provided to actuators on the controlled process.

Safety systems are systems intended to ensure the safety of humans working in the environment of an industrial process. Such systems may include the electronics associated with emergency stop buttons, light curtains and other machine lockouts. Traditionally, safety systems have been implemented by a set of redundant circuits separate from the industrial control system used to control the industrial process with which the safety system is associated. Such safety systems have been hardwired from switches and relays, including specialized safety relays which provide comparison of redundant signals and internal checking of all conditions, such as welded or stuck contacts.

Safety control can be implemented in various manners, depending on the required control complexity and safety complexity, which takes into account the number of controlled zones. A safety controller can be provided in the form of a safety relay for local, small-scale and/or simple safety control, as a module for a modular, more complex configuration or as a more sophisticated but still compact programmable logic controller, fulfilling certain safety ratings. A compact safety controller can be employed within a complex safety network. Safety relays, on the other hand, are particularly useful for small scale emergency stop applications.

A safety device oftentimes is configured to comply with standardized requirements, like a safety integrity level (SIL). Traditional safety control devices are not expandable. Accordingly, the input and output terminals are limited to the originally provided ones of the safety control device, thus limiting the range of applications and generating a need for increased wiring between safety control devices and/or standard control devices.

This is particularly disadvantageous where the safety controller resides within a small cabinet or enclosure where space is limited. Further, increased wiring between components is not desirable in hazardous environments or rough working environments. Conventional expansion of existing safety control systems required I/O to be added in the vicinity of the safety controller, for instance in a side-by-side relation, and cable wiring between the safety controller or small scale safety relay and an I/O device. However, this expanse of the footprint of the controller and the additional wiring or added cable between the safety controller and the I/O component makes the system susceptible to failure, in particular in hazardous or rough environments. Also, such conventional safety controllers either remain restricted to proprietary safety functions or, where making use of the additional I/O, may jeopardize safety.

It is therefore desirable to provide an improved safety controller and industrial control system as well as method that overcomes the above disadvantages in the prior art.

BRIEF DESCRIPTION

In one embodiment of the present disclosure, an industrial safety controller comprises a non-volatile memory configured for storing an industrial control program and at least one processing unit. The industrial safety controller, which may be a safety relay, further comprises connector means configured to communicatively couple the safety controller with an expansion module. The safety controller is configured to receive an input and/or provide an output via an I/O expansion module that is coupled to the safety controller utilizing the connector means. The industrial safety controller may comprise an expansion module bay and the connector means may comprise a bay connector.

In another embodiment of the present disclosure, an industrial control system comprises an industrial safety controller having a connector means. The connector means comprise a backplane connector for connection to a backplane which may be part of the industrial safety controller or external to the industrial safety controller, or a bay connector of an expansion module of the industrial safety controller. The industrial control system further comprises a non-safety I/O expansion module communicatively coupled to the industrial safety controller utilizing the connector means. The industrial control system may further comprise a reset switch or reset button or a muting signal generating device, being coupled to the industrial safety controller via terminals of the non-safety I/O expansion module.

In another embodiment of the present disclosure, a method of controlling non-safety input terminals of an expansion module by an industrial safety controller comprises communicatively coupling an I/O expansion module with the industrial safety controller, utilizing a backplane or a bay connector of an expansion module bay of the industrial safety controller and a module connector. An input signal is received via a non-safety input terminal of the I/O expansion module. The input signal is communicated through the module connector and the backplane or the bay connector, respectively, to at least one processing unit of the industrial safety controller. The method further comprises processing the input signal by the at least one processing unit within a safety function or safety task of the industrial safety controller. The method may further comprise resetting the industrial safety controller in response to the input signal being a reset signal. Alternatively, the method may further comprise muting a safety function of the industrial safety controller in response to the input signal comprising a mute signal.

In yet another embodiment of the present disclosure, non-transitory computer-readable media are provided, which comprise instructions which, when executed by one or more processing units of an industrial safety controller, perform steps of controlling non-safety output terminals of an expansion module by the industrial safety controller. The steps comprise generating an output signal by at least one processing unit of the industrial safety controller. The output signal is communicated through a backplane or a bay connector of an expansion module bay of the industrial safety controller and a module connector of a standard I/O expansion module to said standard I/O expansion module. In a further step, the output signal is provided at a non-safety output terminal of the standard I/O expansion module. The computer-readable media may further comprise instructions which, upon execution, perform a two-channel evaluation to thereby provide the output signal to the non-safety output terminal in a safe manner.

DESCRIPTION OF THE DRAWINGS

These and other features, aspects and advantages of the present disclosure will become better understood when taking into account the following detailed description with reference to the accompanying drawings, in which like characters represent like parts throughout the drawings, wherein.

DETAILED DESCRIPTION

While the present disclosure may be susceptible to various modifications and alternative forms, specific embodiments are shown by way of example in the drawings and are described in detail herein. However, it should be understood that the embodiments are not intended to be limited to the particular forms disclosed. Rather, the disclosure is to cover all modifications, equivalents and alternatives falling within the spirit and scope of the disclosure as defined by the appended claims. Further, although individual embodiments are discussed here in a simplified explanation, the disclosure is intended to cover all combinations of these embodiments. Specifically, while a method is described in relation to FIG. 3 and computer-readable are described in relation to FIG. 4, the process steps of the method of FIG. 3 may be implemented by computer-executable instructions stored on a computer-readable medium and vice versa. Steps of the method described in relation to FIG. 3 and process steps described in relation to the computer-readable medium of FIG. 4 in embodiments embraced by the present disclosure may be combined in a parallel execution or sequential execution. Further, details and elements described with respect to FIG. 1 in embodiments embraced by the present disclosure are combinable with details and elements described in relation to FIG. 2. Finally, in further embodiments, any such details and elements described in relation to FIGS. 1 and 2 are combinable with process steps described in relation to FIGS. 3 and 4.

In the following description of embodiments of the present disclosure, the term industrial safety controller is to be understood as comprising the meaning of a safety relay, which is a kind of small scale industrial safety controller. Further, where in the following the term non-safety terminal or non-safety expansion module is used, this term is to be understood as synonymous with standard terminal or standard expansion module. Further, the term I/O expansion module is to be understood to embrace the meaning of an expansion module having only input terminals, only output terminals or a combination of input and output terminals. The terminals may, where not explicitly defined otherwise, be digital and/or analog.

Figure 1:
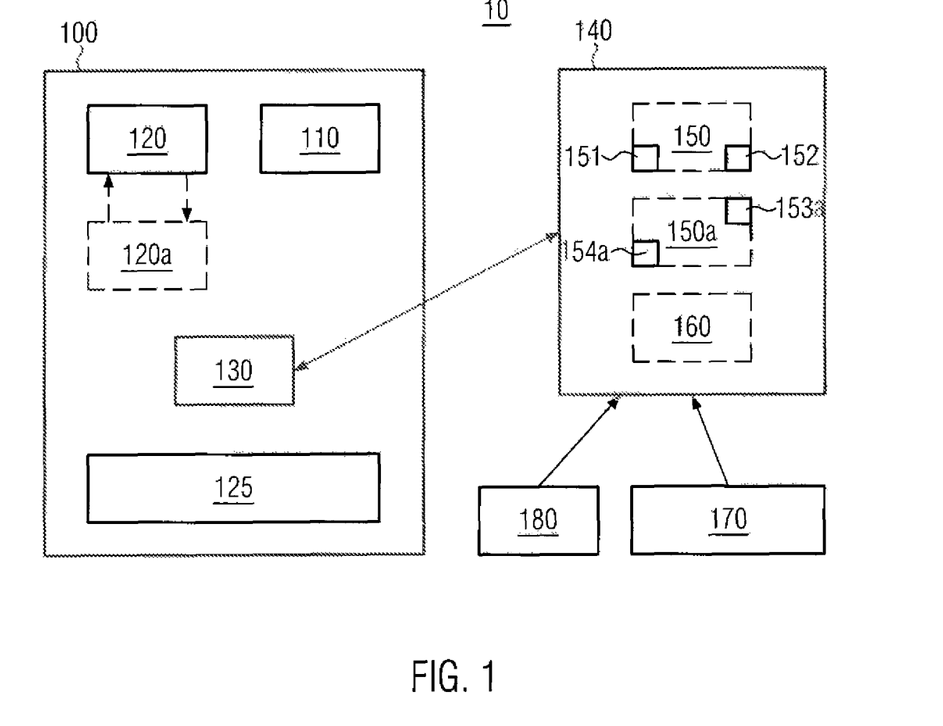
FIG. 1 illustrates a block diagram of an industrial control system comprising an industrial safety controller and a non-safety, standard I/O expansion module, in accordance with an embodiment.

Turning now to the drawings and referring first to FIG. 1, an exemplary industrial control system 10 is illustrated, the system 10 including an industrial safety controller 100 and an expansion module 140. The expansion module 140 and the industrial safety controller 100 can be mounted on a rail, in particular in a side-by-side relation. Alternatively, expansion module 140 can be plugged into a module bay of the industrial safety controller 100, as described in more detail below with respect to FIGS. 2A to 2C.

The industrial safety controller 100 comprises a non-volatile memory 110. The memory 110 stores one or more industrial automation control programs, in particular comprising a safety control program or safety control program module. The controller 100 includes a processing unit 120 and may additionally include at least one more processing unit 120a to provide redundancy and/or increase reliability of the industrial safety controller 100. The processing units 120 and 120a may operate in at least partially redundant manner. Further, processing unit 120a may be configured to only perform non-safety tasks, including communication functions of the industrial safety controller, whereas processing unit 120 performs the safety functions included in a safety control program or safety control part or module of an industrial control system. The industrial safety controller 100 further includes connector means 130, which are configured to communicatively couple the safety controller 100 with an expansion module 140.

An expansion module 140 may comprise a communication module 160, which comprises one of a wired and/or wireless gateway, a local interface and a network interface for providing additional communication functions to the industrial safety controller 100. Further, expansion module 140 may comprise an I/O expansion module 150, which, according to embodiments, comprises non-safety terminals 151, which do not meet the requirements of a predefined safety rating and may comprise safety terminals 152, which comply with a predefined safety rating.

Further, expansion module 140 according to embodiments may comprise non-safety I/O expansion module 150a, which does not comply with a predefined safety rating or safety integrity level. Such a non-safety I/O expansion module 150a is also called a standard I/O expansion module. Non-safety I/O expansion module 150a comprises input terminals 153a and/or output terminals 154a, which may comprise digital and/or analog terminals.

The industrial safety controller 100 receives input signals and/or provides output signals via an I/O expansion module 150, in particular a non-safety I/O expansion module 150a, that is coupled to the safety controller by connector means 130. The connector means 130 may comprise a bay connector of an expansion module bay of the industrial safety controller 100, as described in more detail below with respect to FIGS. 2A to 2C. The connector means 130 alternatively may comprise a backplane connector which connects to a backplane. The industrial safety controller 100 according to embodiments is configured to receive and process an analog input from a non-safety I/O expansion module 150a and/or a non-safe terminal 151 of an I/O expansion module 150 which further may comprise safe terminals 152. Such an analog input can be received on two channels of the industrial safety controller 100 utilizing the connector means 130 and I/O expansion module 150 or non-safety I/O expansion module 150a.

Where the industrial safety controller comprises at least two processing units 120 and 120a, the industrial safety controller may be configured to communicatively couple only a specific one 120a of the at least two processing units with a non-safety I/O expansion module 150a. Alternatively, the coupling of only the specific processing unit 120a may be restricted to certain terminals of an I/O expansion module 150 comprising safe 152 and non-safe 151 terminals, and in particular may be restricted to the set of non-safety terminals 151 of the I/O expansion module 150.

According to an embodiment, the industrial safety controller 100 is a software-configurable safety relay. The industrial safety controller 100 may have its own or embedded safety-rated input and output terminals 125. The housing of the industrial safety controller 100 can be colored red, whereas non-safety I/O expansion module 150a or standard I/O expansion module 150 can have a gray housing. The red color signifies the safety device rating and distinguishes the industrial safety controller 100 from the gray-colored standard controllers and devices.

According to an embodiment, the industrial safety controller 100 may be configured to accept two single-wire safety inputs and to provide two single-wire safety outputs. This allows the industrial safety controller 100 to be an integral part of an extensive machine safeguarding system.

According to an embodiment, the industrial control system 10 may further comprise a reset switch or reset button 180, which is configured to provide a reset input signal and to coupled to an input terminal of an expansion module 140, in particular a non-safety I/O expansion module 150a. Upon receipt of the reset input signal by the industrial safety controller 100 via the non-safety I/O expansion module 150a, the industrial safety controller 100 processes the reset input signal and, as a consequence, resets the industrial safety controller 100. If the industrial safety controller 100 was in a safe state of operation, such that actuators connected to the industrial safety controller are controlled by output signals provided by the industrial safety controller 100 such that hazards to human life or health are obviated, meaning that a machine is shut off or a conveyor belt is stopped, resetting the industrial safety controller 100 changes the output signals provided to the actuators such that the industrial safety controller 100 returns the actuated components into a run state of operation. Simply put, the industrial safety controller 100 returns to a run state of operation upon resetting.

In accordance with present embodiments, the industrial control system 10 further comprises a muting signal generating device 170, which may be at least one of a muting sensor and a muting switch. The industrial safety controller 100, upon receipt of a muting signal received from the muting signal generating device 170 via an input terminal 153a of a non-safety I/O expansion module 150a processes the muting signal and, as a result thereof, mutes a safety function of the industrial safety controller 100, even though the muting signal was received from the non-safe channel provided by the non-safety I/O expansion module 150a. The muting according to embodiments is restricted to a limited period of time and according to present embodiments can be provided via non-safe input channels, which are processed by the safety host, i.e. the industrial safety controller 100, so that a task complying with safety ratings is executed.

According to present embodiments, the industrial safety controller 100 is configured to prohibit access of safety tasks and/or safety functions to output terminals 154a of a non-safety I/O expansion module 150a that is communicatively coupled via the connector means 130 to the industrial safety controller 100. Thereby, compliance with safety ratings or safety standards can be provided although the industrial safety controller 100 is expanded by having access to input and/or output terminals of a non-safety or standard I/O expansion module 150a.

Alternatively, if a feedback channel is implemented at the actuated loads, output signals can be provided via the non-safety I/O expansion module 150a in a safe manner. On a first channel, a plausibility check of the output signal provided to the non-safety output terminal 151 of the I/O expansion module 150 or the output terminal 154a of the non-safety I/O expansion module 150a is performed. On a second channel, a feedback signal from a feedback circuit at one or more loads, at least one of which being actuated by the output signal, is received at one of the embedded input terminals 125 of the industrial safety controller 100. The two channels, comprising the first channel and the second channel, are evaluated by the industrial safety controller 100. A result of the plausibility check is compared and analyzed with respect to the feedback signal received from the feedback circuit. According to an embodiment, in case of a match within a predefined time window, the output signal can be determined as valid within the safety rating, thereby providing the output signal to the non-safety output terminal 151 or 154a of the I/O expansion module 150 or non-safety I/O expansion module 150a in a safe manner.

Figure 2A:
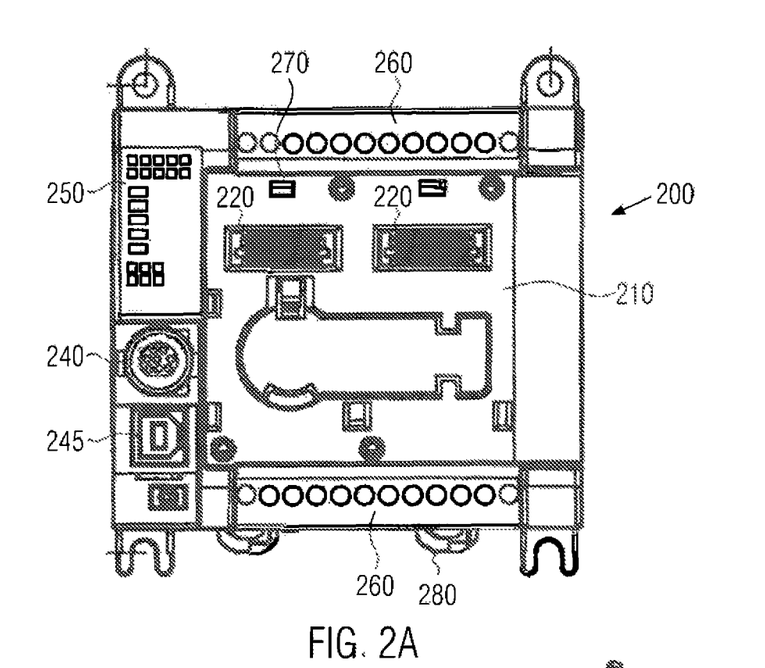
FIG. 2A illustrates a view of an industrial safety controller in accordance with an embodiment.

Turning now to FIG. 2A, an exemplary industrial safety controller 200 in accordance with present embodiments is illustrated. The industrial safety controller 200 comprises an expansion module bay 210, which can take the form of a receptacle, to receive, in embodiments, one or more expansion modules 140, wherein an example is depicted with two bay connectors 220 of expansion module bay 210, which may connect to one expansion module 140 or two expansion modules 140. The industrial safety controller 200 has embedded input and/or output terminals 260. A serial port 240, in particular for RS232 serial communication, and a USB connector 245 are provided. The USB connector depicted in FIG. 2A is a type B connector. Status indicators 250 show at least one of input status, power status, run status, fault status, lock status, serial communications status and output status. Expansion modules 140 can be plugged into the expansion module bay 210 utilizing plug-in latches 270. The industrial safety controller 200 can be mounted to a rail utilizing rail mounting latches 280.

Figure 2B:
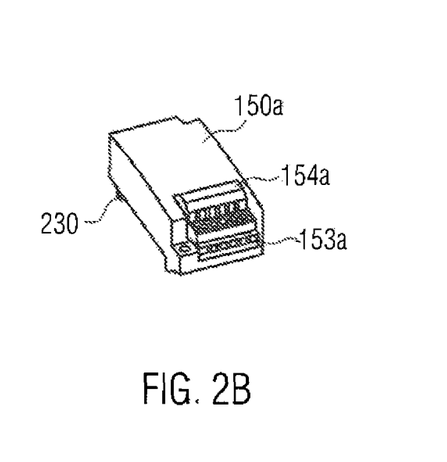
FIG. 2B illustrates a perspective view of a standard I/O expansion module.

Turning now to FIG. 2B, an exemplary standard or non-safety I/O expansion module 150a is illustrated, which comprises input terminals 153a and output terminals 154a and a module connector 230 on the bottom of the expansion module 150a. In an example, four digital inputs 153a and four digital outputs 154a are provided. Further terminals may comprise DC power terminals and sink/source terminals. In other embodiments, two-channel analog inputs are provided. As indicated above, an expansion module 140 for communicative coupling with the industrial safety controller 200 according to embodiments may comprise a communication module 160 or other special purpose modules, such as a real time clock module or a gateway module.

Figure 2C:
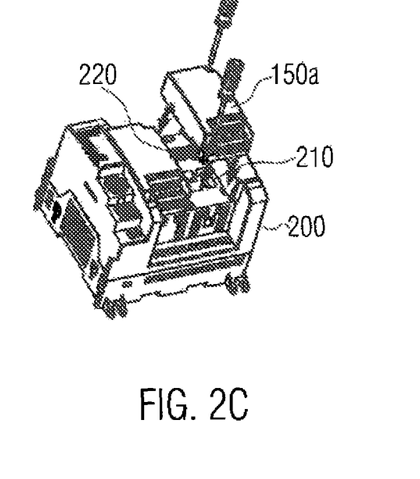
FIG. 2C illustrates a perspective view of an industrial control system in accordance with an embodiment.

Turning now to FIG. 2C, an exemplary industrial control system 10 with an industrial safety controller 100 and a non-safety I/O expansion module 150a is illustrated. The expansion module 150a can be plugged in to the module bay 210 and may be fastened with screws. The module connector 230 couples with the bay connector 220 provided within the expansion module bay 210.

Figure 3:
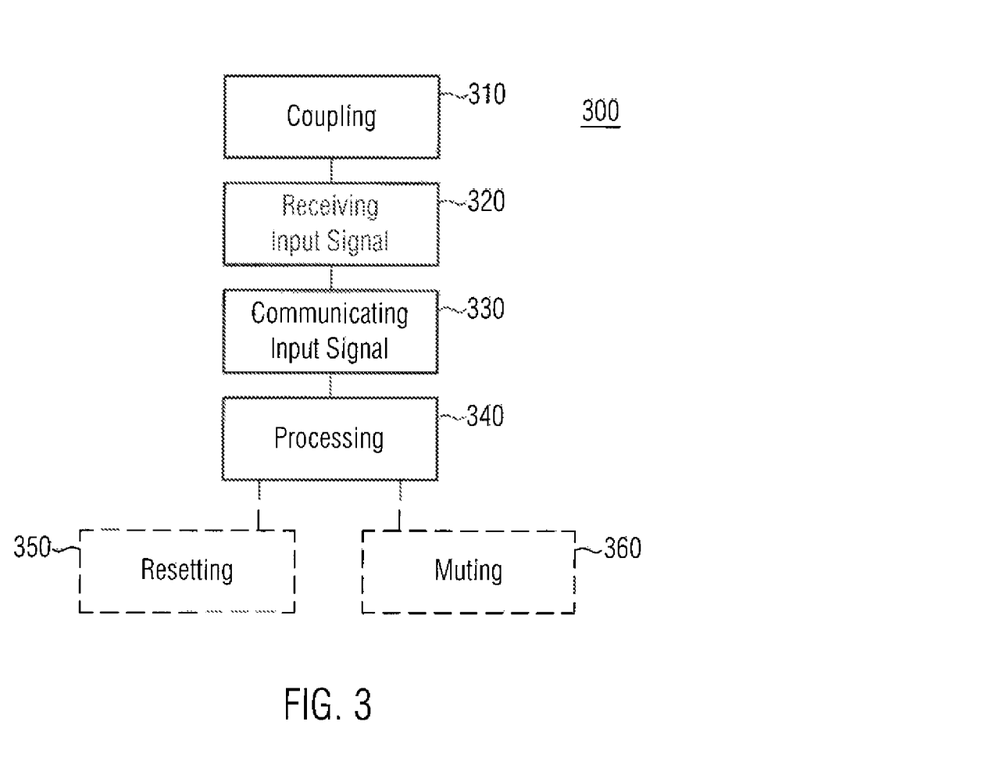
FIG. 3 illustrates a process flow diagram for a method of controlling non-safety input terminals of an expansion module by an industrial safety controller in accordance with an embodiment.

Turning now to FIG. 3, an exemplary method 300 of controlling non-safety input terminals of an expansion module by an industrial safety controller 100 is illustrated. At step 310, an I/O expansion module 150 or 150a is communicatively coupled with an industrial safety controller 100. The industrial safety controller 100 may be an industrial safety controller 200 having an expansion module bay 210 and bay connectors 220. The communicative coupling is accomplished utilizing a backplane or a bay connector 220 of an expansion module bay 210, where provided with the exemplary industrial safety controller 100.

At step 320, an input signal is received at a non-safety input terminal of the I/O expansion module. At step 330, the input signal is communicated to the industrial safety controller and at least one processing unit of the industrial safety controller, through the module connector and the backplane or the bay connector, respectively. At step 340, the input signal is processed by the least one processing unit within a safety function or safety task of the industrial safety controller. This means that while the input signal is received via a non-safe input channel, according to present embodiments, the industrial safety controller can process the received input signal within a safety function or safety task of the industrial safety controller.

According to embodiments, the method further comprises the step 350 of resetting the industrial safety controller in response to the input signal comprising a reset signal. According to further embodiments, the method 300 further comprises the step 360 of muting a safety function of the industrial safety controller in response to receiving a mute signal as the input signal. Accordingly, non-safe devices can be used according to present embodiments to provide signals to an industrial safety controller or safety relay via non-safe I/O modules and/or terminals, wherein the input signals can be processed within safety tasks or safety functions in a safe manner.

Figure 4:
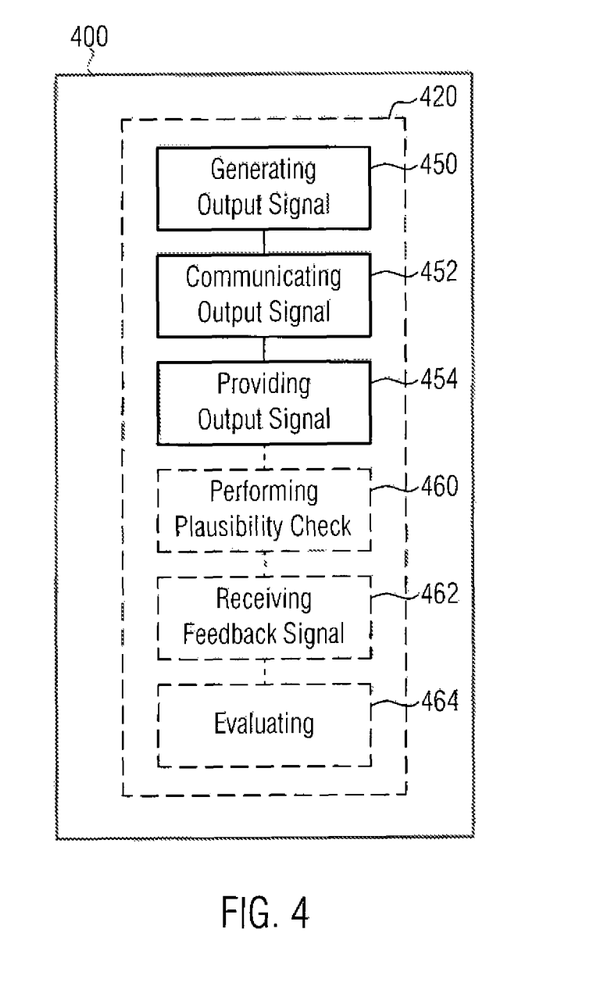
FIG. 4 illustrates a block diagram of computer-readable media comprising instructions which, when executed, perform process steps of controlling non-safety output terminals of an expansion module by an industrial safety controller in accordance with an embodiment.

Turning now to FIG. 4, an exemplary computer-readable medium 400 is illustrated, comprising instructions 420 which, when executed by one or more processing units 120 of an industrial safety controller 100, perform steps of controlling non-safety output terminals of an expansion module by said industrial safety controller. The process steps comprise a step 450 of generating an output signal by at least one processing unit of the industrial safety controller as a result of processing the industrial safety control program. At step 452, the output signal is communicated to a standard I/O expansion module through a backplane or a bay connector of an expansion module bay of the industrial safety controller, respectively, and a module connector. At step 454, the output signal is provided at a non-safety output terminal of the standard I/O expansion module.

According to present embodiments, the non-safety output terminal is not targeted by a safety task of the industrial safety controller. Accordingly, the output signal is not a safety signal. However, an output signal can be correlated to the safety functions of the industrial safety controller. As an example, the output signal may be a control signal to actuate an indicator light indicating an operating state of the industrial safety controller or the controlled process. Alternatively, the output signal may be provided to actuate an alarm sound device and/or a graphical display provided in addition to the main safety-operated device such as a machine switch to shut off a machine or shut down a conveyor belt. According to the presently described embodiments, the industrial control system is thus enhanced by providing the described communicative coupling and processing of terminals of non-safety I/O expansion modules.

According to some embodiments, an output signal can be provided via a non-safety I/O expansion module in a safe manner. This includes the industrial safety controller performing a two-channel evaluation: at step 460, a plausibility check of the output signal provided to the non-safety output terminal is performed by the industrial safety controller. This constitutes a first logical channel of the safety evaluation. At step 462, a feedback input signal is received at a safety terminal of the industrial safety controller itself, the safety terminal being embedded or integrated into the industrial safety controller, from a monitoring circuit provided at a load which is actuated by the output signal. This constitutes a second logical channel of safety evaluation of the output signal. Finally, at step 464, the first and the second channel are evaluated. A result of the plausibility check according to the first channel is analyzed. Further, the feedback signal is analyzed. The two analysis results are utilized to determine compliance. Thereby, the output signal can be provided through the non-safety output terminal in a safe manner.

While only certain features of the invention have been illustrated and described herein, many modifications and changes will occur to those skilled in the art. It is therefore to be understood that the appended claims are intended to cover all such modifications and changes.

The invention claimed is:

1. An industrial safety controller, comprising
a non-volatile memory configured for storing a control program;
at least two processing units, wherein a first processing unit, selected from the at least two processing units, is configured to perform safety functions and wherein a second processing unit, selected from the at least two processing units, is configured to perform non-safety functions; and
a connector means configured to communicatively couple the safety controller with the non-safety I/O expansion module,
wherein:
the safety controller is configurable to receive a non-safety input from the non-safety I/O expansion module that is coupled to the safety controller utilizing the connector means,
the non-safety input is configured to change an operating state of the safety controller from a present operating state to a new operating state, and
the first processing unit is operative to:
verify that the safety controller is in a safe state of operation, and
change the operating state of the safety controller from the present operating state to the new operating state responsive to receiving the non-safety input when the safety controller is in the safe state.

2. The industrial safety controller of claim 1, further comprising
an expansion module bay,
the connector means comprising a bay connector.

3. The industrial safety controller of claim 1, the connector means comprising a backplane connector.

4. The industrial safety controller of claim 1, configured to receive and process an analog input from at least one of the non-safety I/O expansion module and a non-safety terminal of an I/O expansion module further comprising safety terminals.

5. The industrial safety controller of claim 1, configured to use the non-safety I/O expansion module in a safe manner.

6. The industrial safety controller of claim 1, further configured to communicatively couple with a communication module, the communication module comprising one of a wired and wireless gateway, a local interface and a network interface.

7. The industrial safety controller of claim 1, the first and the second processing units are configured to operate in an at least partially redundant manner.

8. The industrial safety controller of claim 1, wherein the non-safety input is a reset input signal and the reset input signal is processed to thereby reset the industrial safety controller, comprising returning the industrial safety controller into a run state of operation.

9. The industrial safety controller of claim 1, configured to receive a muting signal from a muting signal generating device, comprising at least one of a muting sensor and a muting switch, via an input terminal of the non-safety I/O expansion module, and to process the muting signal to mute a safety function of the industrial safety controller.

10. The industrial safety controller of claim 1, wherein the industrial safety controller is a safety relay.

11. The industrial safety controller of claim 1, operable for configuration and/or programming by means of software, wherein a control program resulting from a configuration and/or programming is stored in the non-volatile memory of the industrial safety controller.

12. The industrial safety controller of claim 1, configured to prohibit access of safety tasks to output terminals of a communicatively coupled non-safety I/O expansion module.

13. An industrial control system, comprising
an industrial safety controller having connector means, the connector means comprising a backplane connector or a bay connector of an expansion module bay;
a non-safety I/O expansion module communicatively coupled to the industrial safety controller utilizing the connector means;
a first processing unit configured to perform safety functions; and
a second processing unit configured to perform non-safety functions, wherein:
the industrial safety controller is configurable to receive an input from and to provide an output to the non-safety I/O expansion module, and
the first processing unit is operative to permit an operating state of the industrial safety controller to change responsive to the industrial safety controller receiving the input, from the non-safety I/O expansion module when the industrial safety controller is in a safe state.

14. The industrial control system of claim 13, further comprising one of a reset switch, a reset button, and a muting signal generating device, wherein:
the reset switch or reset button is configured to provide a reset input signal coupled to an input terminal of the non-safety I/O expansion module, and
the muting signal generating device is coupled to an input terminal of the non-safety I/O expansion module, the muting signal generating device comprising at least one of a muting sensor and a muting switch and being configured to provide a muting input signal to mute a safety function of the industrial safety controller.

15. A method of controlling non-safety input terminals of an expansion module by an industrial safety controller, comprising
communicatively coupling an I/O expansion module with the industrial safety controller utilizing a backplane or a bay connector of an expansion module bay of the industrial safety controller and a module connector;
receiving an input signal via a non-safety input terminal of the I/O expansion module;
communicating the input signal through the module connector and the backplane or the bay connector, respectively, to a first processing unit of the industrial safety controller;
processing the input signal by the first processing unit wherein only the first processing unit is configured to receive the input signal from the non-safety input terminal;
processing at least one safety function with a second processing unit of the industrial safety controller, wherein the at least one safety unction verifies that the industrial safety controller is in a safe operating state and the second processing unit allows the industrial safety controller to change from a present operating state to a new operating state responsive to receiving the input signal when the industrial safety controller is in the safe operating state.

16. The method of claim 15, the input signal comprising a reset signal, the changing from the present operating state to the new operating state comprising resetting the industrial safety controller.

17. The method of claim 15, the input signal comprising a mute signal, the changing from the present operating state to the new operating state comprising muting a safety function of the industrial safety controller.

18. One or more non-transitory computer-readable media comprising instructions which when executed by one or more processing units of an industrial safety controller perform steps of controlling non-safety output terminals of an expansion module by the industrial safety controller, comprising steps of
generating, by a first processing unit of the industrial safety controller, an output signal;
communicating the output signal, through a backplane or a bay connector of an expansion module bay of the industrial safety controller and a module connector of a non-safety I/O expansion module, to said non-safety I/O expansion module;
providing the output signal at a non-safety output terminal of the non-safety I/O expansion module, wherein only the first processing unit is configurable to receive an input from and to provide an output to the non-safety I/O expansion module;
performing, according to a first channel, a plausibility check of the output signal provided to the non-safety output terminal;
receiving, according to a second channel, at a safety input terminal of the industrial safety controller, a feedback signal from a monitoring circuit at a load actuated by the output signal; and
evaluating the first and the second channel, comprising analyzing a result of the plausibility check and the feedback signal, to thereby provide the output signal to the non-safety output terminal in a safe manner.

19. The one or more non-transitory computer-readable media of claim 18, wherein the output signal is configured to control at least one of an indicator light, alarm sound device and graphical display.

* * * * *

UNITED STATES PATENT AND TRADEMARK OFFICE
CERTIFICATE OF CORRECTION

PATENT NO. : 10,031,502 B2
APPLICATION NO. : 14/671464
DATED : July 24, 2018
INVENTOR(S) : Prosak et al.

Page 1 of 1

It is certified that error appears in the above-identified patent and that said Letters Patent is hereby corrected as shown below:

In the Claims

Claim 13, Column 9, Line 49, replace "input," with "input"

Claim 15, Column 10, Line 17, replace "unction" with "function"

Signed and Sealed this
Nineteenth Day of February, 2019

Andrei Iancu
*Director of the United States Patent and Trademark Office*